United States Patent [19]

Hashiguchi et al.

[11] Patent Number: 4,870,143
[45] Date of Patent: Sep. 26, 1989

[54] PROCESS FOR SUSPENSION POLYMERIZATION

[75] Inventors: Yoshiyuki Hashiguchi, Kobe; Masakiti Kishi, Himeji; Takehiko Yagyu, Takasago, all of Japan

[73] Assignee: Kanegafuchi Chemical Industry Co., Ltd., Osaka, Japan

[21] Appl. No.: 135,452

[22] Filed: Dec. 21, 1987

[30] Foreign Application Priority Data

Dec. 19, 1986 [JP] Japan .................. 61-304958

[51] Int. Cl.⁴ .................. C08F 2/20; C08F 12/08
[52] U.S. Cl. .................. 526/70; 526/67; 526/83; 526/88; 526/202; 526/203; 526/233; 526/234; 526/236; 526/237; 526/346; 526/910
[58] Field of Search .................. 526/70, 88, 910, 346, 526/83, 202, 203, 233, 234, 236, 237, 87

[56] References Cited

U.S. PATENT DOCUMENTS 3,922,255 11/1975 Koestler et al. .................. 526/65
4,487,898 12/1984 Kato et al. .................. 526/65

FOREIGN PATENT DOCUMENTS 0492682 5/1953 Canada .................. 526/70
0219230 11/1985 Japan .................. 526/88

Primary Examiner—Joseph L. Schofer
Assistant Examiner—F. M. Teskin
Attorney, Agent, or Firm—Wegner & Bretschneider

[57] ABSTRACT

By a process for suspension polymerization, which comprises steps of:

supplying a slurry comprising droplets of a monomer liquid having a substantially uniform size dispersed in an aqueous dispersion medium to a tower type reactor in which said medium forms a downflow, and suspension polymerizing the monomer with avoiding merging or splitting of the droplets in a fluidized bed which is formed by the downflow of said medium and buoyancy of the monomer liquid droplets, wherein the specific gravity of said medium is made larger than that of a polymer particle to be produced by the addition of a water soluble inorganic salt to said medium, and a polycarboxylic acid type anionic polymeric surfactant is used as a suspension stabilizer for the monomer liquid droplets, polymer particles having a substantially uniform size are produced with high polymerization conversion.

38 Claims, 2 Drawing Sheets

PROCESS FOR SUSPENSION POLYMERIZATION

BACKGROUND OF THE INVENTION

1. Field of the Invention

The present invention relates to a process and an apparatus for suspension polymerization. More particularly, it relates to a process and an apparatus for suspension polymerization which can produce polymer particles having a uniform particle size.

2. Description of Prior Art

As a process for suspension polymerization by which polymer particles having a uniform particle size can be produced, known is a suspension polymerization process which comprises steps of forming a fluidized bed comprising an aqueous dispersion medium and monomer liquid droplets in a tower type reactor and suspension polymerizing the monomer. That is, the monomer liquid droplets having a uniform size are formed in the aqueous dispersion medium containing a suspension stabilizer for the monomer liquid droplets and then a fluidized bed of the medium containing the monomer liquid droplets is formed by utilizing the difference of specific gravity between the monomer liquid and the dispersion medium (usually the monomer liquid is lighter than the aqueous dispersion) in a tower type reactor in which a downflow of the aqueous dispersion medium is formed. Thereafter, the monomer is polymerized without applying strong shear to the monomer liquid droplets, whereby the monomer can be polymerized with avoiding merging or splitting of the monomer liquid droplets.

For example, Japanese Patent Publication No. 36510/1978 or U.S. Pat. No. 3,922,255 discloses an suspension polymerization process in which a monomer liquid is passed thorough an orifice or orifices to form droplets having a uniform size, charged in a reactor and partially polymerized in the reactor to such extent that the droplets are not merged or split with gentle shear. Then, the partially polymerized monomer liquid droplets are removed from a bottom of the reactor together with the aqueous dispersion medium and introduced in a solid-liquid separator which is connected with the reactor, in which the partially polymerized droplets are flotation separated and concentrated. The separated droplets are charged in an agitated reactor and suspension polymerized with avoiding merging or splitting to give a polymer with a high polymerization conversion.

Japanese Patent Publication No. 91701/1983 or U.S. Pat. No. 4,487,898 discloses a suspension polymerization process in which a laminar flow of a monomer liquid is gushed from a vibrating orifice to form monomer liquid droplets having a uniform size, introduced in a tower type reactor and partially polymerized to such extent that the specific gravity of the monomer liquid droplets becomes close to that of the aqueous dispersion medium. A slurry comprising the partially polymerized monomer liquid droplets and the dispersion medium is circulated through the tower type reactor and a precipitator, during which the partially polymerized monomer liquid droplets having a specific gravity larger than that of the dispersion medium is precipitated and concentrated in the precipitator, and then charged in a second tower type reactor to further continue suspension polymerization, whereby a polymer is continuously produced with a high polymerization conversion.

Such conventional processes require the floatation separator or the precipitator which is connected with the reactor and should be operated very carefully, since the dispersion medium has substantially the same specific gravity as water the gravity of which is about one (1) around room temperature and the partially polymerized soft droplets formed in the reactor is to be separated from the aqueous dispersion medium. In addition, to further polymerize the partially polymerized droplets to such extent that the droplets can be dehydrated, dried and stored, a specially designed reactor which requires special attention for mixing and stirring should be used to further polymerize the partially polymerized soft droplets.

In the conventional processes, the partially polymerized droplets with a conversion of from about 30 to 60% are so soft that they tend to merge with each other or stick to a wall of the apparatus where a flow rate is small and the stream is retained in the floatation separator or the precipitator. Therefore, the apparatus should be very carefully operated for stable operation. In addition, since the partially polymerized droplets are further polymerized, the agitated type reactor should have specially designed agitating blades and be operated with a limited range of rotational speed in order to prevent splitting of the partially polymerized soft droplets and formation of smaller droplets. When the tower type reactor is used, upward flow of the aqueous dispersion medium should be formed therein, and a flow rate of said upward flow and a slope angle of a conical bottom portion of the reactor should be carefully arranged. Further, mixing of the monomer liquid droplets having low polymerization conversion will cause merging due to retention in an upper portion of the reactor.

The conventional processes in which the partially polymerized monomer liquid droplets are separated from the aqueous dispersion medium and concentrated, and then further polymerized to achieve higher conversion require not only complicated apparatus because of the properties of the partially polymerized droplets, but also involve technical problems such as careful operation of the apparatus.

SUMMARY OF THE INVENTION

An object of the present invention is to provide a process for suspension polymerization which does not suffer from the drawbacks of the above described conventional processes and which can achieve a high polymerization conversion without using any complicated apparatus inevitably required in the conventional processes.

According to one aspect of the present invention, there is provided a process for suspension polymerization, which comprises steps of:

supplying a slurry comprising droplets of a monomer liquid having a substantially uniform size dispersed in an aqueous dispersion medium to a tower type reactor in which an aqueous dispersion medium heated at a polymerization temperature is charged from an upper portion of said reactor to form a downflow in the reactor, discharged from a lower part of said reactor and recycled to the upper portion of said reactor, and suspension polymerizing the monomer with avoiding merging or splitting of the droplets in a fluidized bed which is formed by the downflow of aqueous dispersion medium and buoyancy of the monomer liquid droplets, wherein the specific gravity of the aqueous dispersion medium is made larger than that of a polymer particle which is produced by suspension polymerization of the monomer liquid by the addition of a water soluble inorganic salt to the aqueous dispersion medium, and a polycarboxylic acid type anionic surfactant is used as a suspension stabilizer for the monomer liquid droplets, whereby a slurry comprising the aqueous dispersion medium and said polymer particles with high polymerization conversion is recovered directly from the reactor.

According to another aspect of the present invention, there is provided an apparatus for use in suspension polymerization, which comprises a tower type reactor which has conical shape upper and lower portions, an inlet opening in the upper portion thereof for forming a downflow of an aqueous dispersion medium and an outlet opening in the lower portion thereof for discharging the aqueous dispersion medium, a circulating line connecting said outlet opening and said inlet opening for discharging the aqueous dispersion medium from said outlet opening and recycling said medium to said inlet opening, a supply line connected to said circulating line near the upper portion of the reactor for charging a slurry comprising droplets of a monomer liquid and the aqueous dispersion medium, and a recovering line connected to said circulating line near the lower portion of the reactor for recovering a slurry comprising polymer particles and the aqueous dispersion medium.

DETAILED DESCRIPTION OF THE INVENTION

Figure 1A:
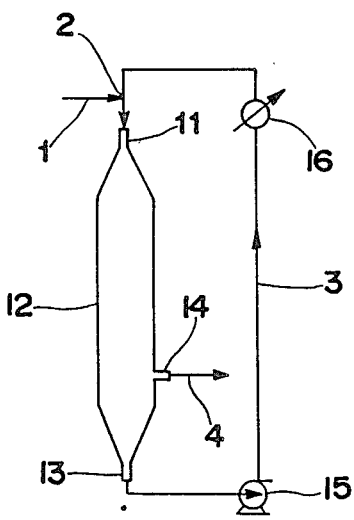
FIGS. 1 to 5 schematically show the polymerization apparatuses according to the present invention.

According to the present invention, the aqueous dispersion medium heated at the polymerization temperature is charged from the upper portion of a tower type reactor to form a downflow in the reactor, discharged from the lower portion of the reactor and recycled to the upper portion of the reactor. Then, the slurry comprising droplets of the monomer liquid having a substantially uniform size dispersed in the aqueous dispersion medium is charged into the tower type reactor in which the aqueous dispersion medium is circulated. The charged monomer liquid droplets are suspension polymerized with avoiding merging or splitting thereof in the fluidized bed which is formed by the downflow of aqueous dispersion medium and buoyancy of the droplets.

In the suspension polymerization according to the present invention, as a suspension stabilizer for the monomer liquid droplets, is used a polycarboxylic acid type polymeric anionic surfactant, which has a suspension stabilizing effect when the aqueous dispersion medium contains an inorganic salt even at a high concentration, and the inorganic salt is added to the aqueous dispersion medium to make the specific gravity of the aqueous dispersion medium larger than that of the polymer particle which is produced by suspension polymerization of the monomer liquid. Thereby, the monomer liquid droplets can be retained in the reactor till the conversion becomes high enough, and the slurry comprising the aqueous dispersion medium and the droplets in which the polymer is formed with high conversion is easily recovered from the reactor through the recovering line connected to the circulating line near the lower portion of the reactor.

According to the present invention, any special separating equipment and/or any independent equipment for increasing the polymerization conversion are not necessary.

Now, (1) the aqueous dispersion medium and (2) the polymerization steps and apparatus will be explained.

(1) Aqueous dispersion medium

To adjust the specific gravity of the aqueous dispersion medium, a water soluble inorganic salt or a mixture of such salts (a specific gravity modifying agent) is used. Examples of the inorganic salt are chlorides, nitrides and sulfates of alkali or alkaline earth metals or ammonia such as sodium chloride, potassium chloride, magnesium chloride, ammonium nitride, sodium nitride, potassium nitride, calcium sulfate and magnesium sulfate.

According to the present invention, the specific gravity of the aqueous dispersion medium is larger than that of the polymer to be produced. Specific gravities of the typical polymers are shown in Table 1. Therefore, the inorganic salt is added to the medium to make the specific gravity of the medium from 1.05 to 1.20 (at room temperature) or higher.

TABLE 1

| Polymer | Specific gravity[*1] |
|---------|---------------------|
| AS resin | 1.06–1.08 |
| MMA resin | 1.08–1.13 |
| St resin | 1.05 |
| AN resin | 1.19 |
| Ion exchange resin | 05–1.15[*2] |
| | 1.34 |

Note [*1] Excerpt from "Kobunshi (polyker) Data Handbook" (published by Baifukan in 1986)
[*2] From a Catalog by Sumitomo Chemical Co. Ltd.

When a mixture comprising mainly styrene is used as the monomer liquid and a mixture comprising mainly sodium chloride is used as the specific gravity modifying agent, the sodium chloride mixture is used in a concentration of at least 7.5% by weight at which the aqueous dispersion medium has a specific gravity equal to that of polystyrene. The maximum concentration of the specific gravity modifying agent is so selected that the monomer liquid droplets are not merged by compression flattening due to a large difference of specific gravity between the monomer liquid and the aqueous dispersion medium in the fluidized bed formed in the tower type reactor. Such compression flattening of the monomer liquid droplets depends on the droplet size of monomer liquid droplets and the superficial velocity of the downflow of aqueous dispersion medium in the cylindrical portion of reactor. When the droplet size is 1 mm and the superficial velocity of aqueous dispersion medium is 0.52 cm/sec., the compression flattening begins at about 15 by weight of sodium chloride concentration, at which the aqueous dispersion medium has a specific gravity of about 1.17. That is, the concentration of sodium chloride mixture is in a range of from 7.5 to 15% by weight, preferably in a range of from 12 to 13% by weight in which the fluidized bed in the reactor is most stabilized. When the particle size is larger or smaller than 1 mm or when other monomer and/or other specific gravity modifying agent are used, a suitable concentration of the specific gravity modifying agent in the aqueous dispersion medium can be determined according to the above described manner.

It may be conceived to use an organic material such as sucrose, glycerin and urea as the specific gravity modifying agent. However, sucrose and glycerin increase viscosity of the aqueous dispersion medium and tend to cause merging or splitting of the monomer liquid droplets. Urea can be used in suspension polymerization, but it is decomposed at the polymerization temperature to generate ammonia and carbon dioxide.

The suspension stabilizer is used to prevent merging or splitting during formation of the monomer liquid droplet having a uniform size and during suspension polymerization in the fluidized bed formed in the tower type reactor. Examples of the suspension stabilizer are polymeric protective colloid (e.g. polyvinyl alcohol, methycellulose derivatives, polysodium acrylate, etc.), powdery inorganic compounds hardly soluble in water (e.g. calcium phosphate, calcium carbonate, magnesium pyrophosphate, etc.) and anionic surfactants as well as mixtures thereof.

The polymeric protective colloid is used in a concentration of at least 30 ppm. Since the protective colloid partially emulsifies the monomer liquid even if its amount is very small, a water soluble polymerization inhibitor such as ferric chloride, sodium nitrite and hydroquinone is co-used. When the protective colloid is used in a concentration higher than 10,000 ppm, the whole monomer liquid is unpreferably emulsified.

The inorganic compound hardly soluble in water is used in a concentration of at least 0.03% by weight, and preferably not more than 1% by weight since the effect of the inorganic compound is not increased at a concentration higher than 1% by weight.

A kind of anionic surfactant is carefully selected. Some kinds of anionic surfactant may have decreased suspension stabilizing effect on the monomer liquid droplets, so that the droplets merge with each other to deteriorate uniformity of the droplet size. In addition, at the polymerization temperature, the suspension stabilizing effect is further decreased, and the surfactant almost loses its effect for stabilizing suspension of the monomer liquid droplets in the fluid state in the tower type reactor. For suspension stabilization in the process according to the present invention, polycarboxylic acid type polymeric anionic surfactants are found to be suitable. Preferred examples of such anionic surfactant are a copolymer of a salt of maleic acid with light metal such as lithium, sodium, potassium calcium, magnesium and aluminum and a salt of a copolymer of maleic acid with such light metal as well as mixtures thereof. Examples of comonomers which are copolymerizable with the salt of maleic acid or free maleic acid are $C_4$-$C_{22}$ olefin, $C_1$-$C_8$ alkyl methacrylate and styrene. Commercially available ones are POPYSTAR-OMP (trade name) by Nippon Oil & Fats Co., Ltd., CARRYBON B (trade name) by Sanyo Chemical Industries, Ltd. and DEMOL EP (trade name) by Kao Corp.

Surface tension and interfacial tension of the aqueous solution of the polycarboxylic acid type polymeric anionic surfactant (DEMOL EP) and sodium alkyl sulfonate are shown in Table 2. They are measured at 20° C., at a surfactant concentration of 20 ppm and a sodium chloride concentration of 15% by weight.

TABLE 2

|  | polycarboxylic acid type polymeric anionic surfactant | Sodium alkylsulfonate |
|---|---|---|
| Surface tension | 54 dyn/cm | 35 dyn/cm |
| Interfacial tension[(*1)] | 17 dyn/cm | 3 dyn/cm |

Note [(*1)] Fifty ppm of the polymeric protective colloid was co-used. An oil phase was styrene.

When the polycarboxylic acid type polymeric anionic surfactant is used, the surface tension of aqueous dispersion medium is about 54 dyn/cm, and the suspension stability both during formation of the monomer liquid droplet and during the suspension polymerization in the tower type reactor is excellent.

A concentration of polycarboxylic acid type polymeric anionic surfactant is preferably from 0.0003 to 0.002% by weight based on the weight of aqueous dispersion medium. When it is less than 0.0003% by weight or larger than 0.002% by weight, the suspension stabilizing effect of polycarboxylic acid type polymeric anionic surfactant is slightly decreased.

(2) Polymerization steps and apparatus

The monomer liquid is charged into a droplet-forming device through a supply line for monomer liquid and dropwise added through an orifice(s) to the aqueous dispersion medium which is supplied from another supply line for aqueous dispersion medium.

As the monomer liquid, there are exemplified monovynyl aromatic compounds (e.g. styrene and α-methylstyrene), poly-vinyl aromatic compounds (e.g. divinylbenzene), esters of $\alpha,\beta$-ethylenically unsaturated carboxylic acids (e.g. acrylate and methacrylate), unsaturated nitriles (e.g. acrylonitrile), aliphatic vinyl ester (e.g. vinyl acetate), halo-olefins (e.g. vinyl chloride) and mixtures thereof.

As a polymerization initiator, any conventional compound which is used as an initiator for radically polymerizing a vinyl monomer may be used. Examples of the polymerization initiator are organic peroxides (e.g. benzoyl peroxide, butyl perbenzoate, etc.) and azo compounds (e.g. azobisisobutyronitrile). The initiator may be dissolved in the monomer liquid. According to a property to be possessed by the polymer particle, the monomer liquid may contain a material which can be dissolved or dispersed therein. The size of monomer liquid droplet can be unified by adjusting the viscosity of the monomer liquid passed through the orifices by, for example, dissolving the polymer of said monomer in the monomer liquid.

The formation of monomer liquid droplets having a uniform size by using a droplet-forming device is known (cf. Japanese Patent Kokai Publication No. 128701/1982). When the monomer liquid is supplied in the form of a laminar flow into the aqueous dispersion medium the composition of which has been adjusted as described above, application of vibration to the monomer liquid on or near an orifice plate preferably facilitates the uniformity of monomer liquid droplet size.

The present invention will be illustrated by making reference to the accompanying drawings by way of example.

FIG. 1A shows one of the most simple polymerization apparatuses, in which a slurry containing the monomer liquid droplets formed by the droplet-forming means (not shown) and the aqueous dispersion medium is introduced in a tower type reactor 12 through an inlet 2 for slurry.

A ratio of the monomer liquid droplets and the aqueous dispersion medium in the slurry to be introduced can be determined from an inner diameter of a supply line 1 which is selected so as to prevent retention of the monomer liquid droplets and precipitation of the inorganic compound hardly soluble in water.

Figure 1B:
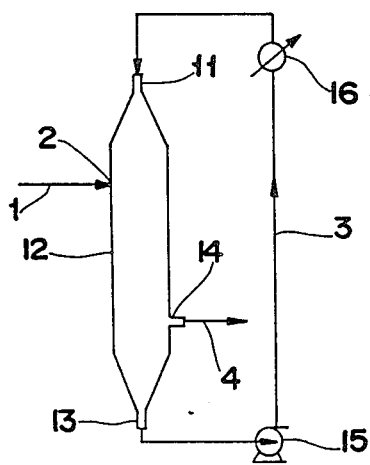
Figure 1C:
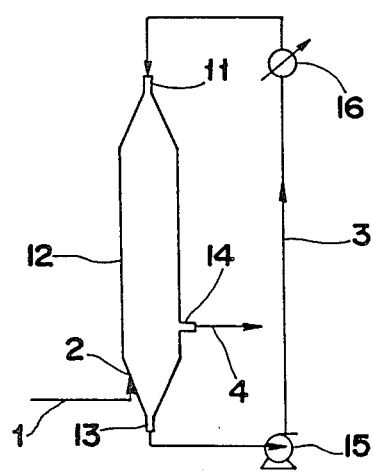

The slurry inlet 2 is preferably installed at the reactor head as shown in FIG. 1A although it may be installed on a side wall near the reactor head as shown in FIG. 1B, or at the reactor bottom or on a side wall near the reactor bottom as shown in FIG. 1C.

When the suspension polymerization is continuously carried out in the tower type reactor 12, a downflow of the aqueous dispersion medium temperature and flow rate of which are regulated is formed in the reactor 12 by circulating the aqueous dispersion medium from an outlet 13 for aqueous dispersion medium, though a liquid conveying means 15 and a temperature controlling (heating and cooling) means 16 to an inlet 11 for aqueous dispersion medium. The polymerization temperature may be the same as in the conventional suspension polymerization.

The liquid conveying means 15 is generally a pump although a propeller may be installed in a circulating line 3 to cause flow of the aqueous dispersion medium. Alternatively, an aqueous dispersion medium having the same composition of the aqueous dispersion medium in the reactor is jetted in the circulating line 3 to generate a jet stream by which the aqueous dispersion medium is caused to flow.

The heating and cooling means 16 adjust the temperature of the aqueous dispersion medium at polymerization temperature and usually is a heat exchanger. Alternatively, steam or hot or cold water may be directly introduced in the circulating line 3. In view of stability of the monomer liquid droplet formation and polymerization, it is desirable not to generate pulsating flow or vibration in the circulated aqueous dispersion medium. When the pulsating flow or vibration is generated, it can be damped by connecting a cushioning tank or an accumulator in the circulating line 3. The liquid conveying means 15 and the heating and cooling means 16 may be installed in reverse order.

Figure 2:
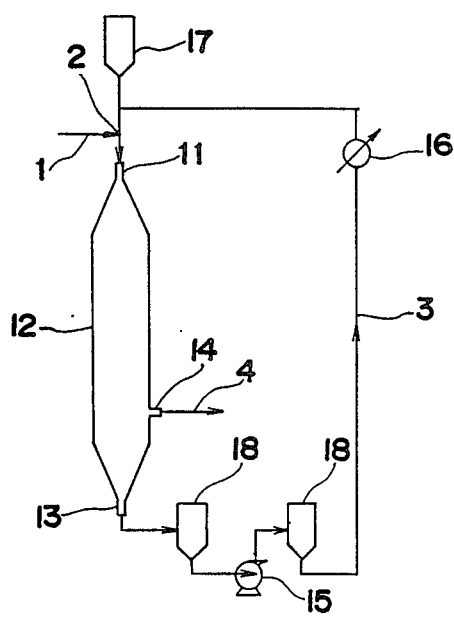

In FIG. 2, accumulators or cushioning tanks 18 are installed before and after a pump 15 as the liquid conveying means. When the pulsating flow is generated in the circulating aqueous dispersion medium, it can be damped by the accumulators or cushioning tanks to decrease an adverse effect of the pulsating flow on the formation of monomer liquid droplets having uniform size by means of the orifice plate (not shown). The design of FIG. 2 is particularly suitable in case where the droplet-forming means comprises a vibrating orifice plate for forming monomer liquid droplets having uniform size.

Dissolved air in the aqueous dispersion medium and the monomer liquid generates bubbles by rise of temperature during polymerization and in turn decrease of solubility of air as the polymerization proceeds. The presence of bubbles is not desirable for stability of polymerization. To avoid the adverse effect of the air bubbles, the dissolved air is deaerated from the aqueous dispersion medium and the monomer liquid before use. Alternatively, pressurization increases solubility of air in the liquid. If the formation of bubbles is expected, a head tank 17 is provided at a position higher than any part of the circulating line 3 as shown in FIG. 2 to remove the bubbles which rise from the reactor head through the inlet 11.

The flow rate of downflow of aqueous dispersion medium in the tower type reactor 12 is kept smaller than the rising rate of the monomer liquid droplets which flow upwardly due to buoyancy generated from the difference of specific gravity between the monomer liquid and the aqueous dispersion medium. Thereby, a fluidized bed of the monomer liquid droplets is formed by buoyancy of the monomer liquid droplets and downward force of the flow of aqueous dispersion medium, and polymerization proceeds in the fluidized bed. The flow rate of the aqueous dispersion medium is controlled so that the monomer liquid droplets are not split by shear force generated by the flow of aqueous dispersion medium and the monomer liquid droplets do not reach the circulating line at the reactor head. The flow rate of aqueous dispersion medium varies with the concentration of inorganic salt as the specific gravity modifying agent and preferably from 0.1 to 1 cm/sec. in the cylinder portion of the tower type reactor in view of stability of the fluidized bed.

By keeping the flow rate of downflow of aqueous dispersion medium in the circulating line 3 connected to the inlet 11 larger than the rising rate of monomer liquid droplets, the rise of monomer liquid droplets from the reactor 12 to the circulating line 3 at the reactor head is prevented.

If air bubbles are formed, they are removed from the head tank 17 through the inlet 11 by adjusting the flow rate of aqueous dispersion medium in the reactor 12 and the circulating line 3 connected to the inlet 11 to be smaller than a rising rate of air bubbles. Therefore, the flow rates of downflows in the reactor, the inlet 11 and the circulating line 3 connected to the inlet 11 should be smaller than the rising rate of air bubbles and larger than the rising rate of the monomer liquid droplets. The flow rates of the downflows can be easily determined since the difference of specific gravity between the air bubble and the monomer liquid is large. At such flow rates, a steady state of the stable fluidized bed is maintained.

As the polymerization of the monomer liquid droplets in the tower type reactor proceeds and the polymerization conversion increases with passage of retention time, the specific gravity of droplets increases and the difference of specific gravity between the droplets and the aqueous dispersion medium decreases so that a preferable state of the fluidized bed of monomer liquid droplets is realized in almost all portions in the reactor 12. When the droplets are not merged or split and continue to have uniform size, the droplets in which the polymerization conversion increases are accumulated in the lower part of fluidized bed, and freshly supplied monomer liquid droplets are accumulated in the upper part of the fluidized bed. As the supply of monomer liquid droplets is continued, the length of the fluidized bed increases and finally its lower end reaches near the outlet 14 for recovering the slurry installed at the lower part of the reactor. The polymerization conversion depends on the retention time in the reactor 12. Thus, when the height of the outlet 14 for recovering the slurry is adequately selected, the suspension polymerization proceeds in a retention time in which the droplets reach the outlet 14 so that polymer particles with desired polymerization conversion can be recovered. The "desired polymerization conversion" herein used is intended to mean that the polymer particle can be resistant to shear force generated by the agitation blades and/or mechanical force generated by the liquid conveying pump and also a centrifugal separator which is used for solid-liquid separation of the slurry containing the polymer particles. Preferably, the polymerization conversion is at least 85%.

As the specific gravity of the aqueous dispersion medium is larger than that of the droplets when the polymerization is completed (hereinafter such droplets are referred to as "polymer particles"), it is easy to separate the polymer particles from the aqueous dispersion medium, and no polymer particle is removed from the outlet 13 for recovering aqueous dispersion medium. When the polymer particles have a small particle size and are accompanied in channelling of the downflow of aqueous dispersion medium, preferably the flow rate of aqueous dispersion medium in the lower portion of reactor is made smaller than that in the upper portion of reactor, for example at 0.3 cm/sec. or less. In such case, the reactor has a multistage shape with a larger diameter in the lower portion than that in the upper portion (see FIG. 3) or a conical shape having the smallest diameter at its top and the largest diameter at its bottom. When the lower end of fluidized bed of the monomer liquid droplets reaches the outlet 14, the slurry containing the polymer particles and the aqueous dispersion medium is recovered and conveyed through a polymer recovering line 4 to a tank (not shown) for storing the polymer particles. At this point, the concentration of polymer particles in the slurry is substantially the same as that of the monomer liquid droplets in the slurry supplied from the slurry supplying inlet 2 at the reactor head.

Figure 4:
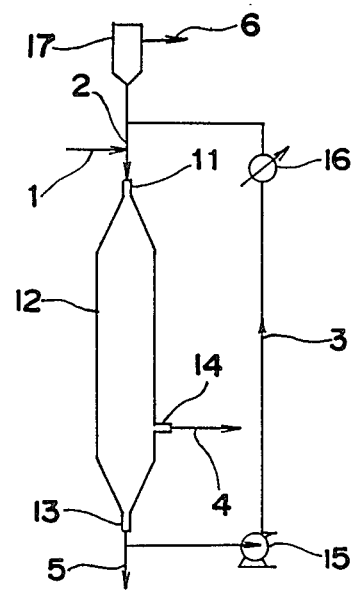

The slurry containing the polymer particles and the aqueous dispersion medium is continuously recovered from the outlet 14. To stop the polymerization process, the supply of the slurry containing the monomer liquid droplets from the inlet 2 is stopped. However, as soon as the supply of the monomer liquid droplets is stopped, the amount of polymer particles recovered from the outlet 14 decreases. In addition, since the polymer particles have smaller specific gravity than the aqueous dispersion medium, a large amount of the polymer particles remains in the reactor and is difficultly recovered from the outlet 14 when the finally supplied monomer liquid droplets are polymerized with the desired polymerization conversion. In the first measure for recovering the remaining polymer particles in the reactor, the slurry containing the polymer particles is gradually raised into the head tank 17 by using the difference of specific gravity between the polymer particles and the aqueous dispersion medium and then the polymer particles are recovered from the head tank 17 (see FIG. 4). In this measure, by closing the outlet 14 for recovering the slurry and making the flow rate of downflow of the aqueous dispersion medium at the inlet 11 smaller than the rising rate of the polymer particles, the slurry containing the polymer particles at a specific concentration rises from the reactor to the head tank 17 through the inlet 11 and is then recovered from the tank 17 through a slurry recovering line 6. In the second measure for recovering the remaining polymer particles in the reactor, the circulating flow of aqueous dispersion medium is stopped and then the slurry is recovered from the reactor 12 through a slurry recovering line 5 to a tank (not shown) for storing the polymer particles which tank has a larger volume than the interior volume of the reactor.

Although the process of the present invention has been illustrated as a continuous method, it can be carried out batchwise. In the batchwise process, the apparatus is the same as used in the continuous process except that the aqueous dispersion medium contained in the reactor at first is at room temperature. A required amount of the slurry containing the monomer liquid and the aqueous dispersion mediums is introduced in the reactor and heated to suitable temperature. Then the polymerization reaction proceeds with forming the fluidized bed of the monomer liquid droplets in the reactor till the polymer particles having the intended polymerization conversion are produced. Then, the polymer particles having the intended high polymerization conversion are recovered from the reactor in the same manner as in the case where the supply of the monomer slurry is stopped to stop the polymerization in the continuous process.

Figure 5:
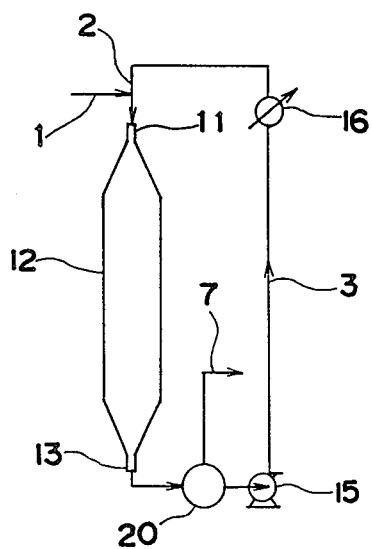

In the continuous process carried out in the apparatus according to the present invention, the polymer particles are easily separated from the aqueous dispersion medium, since the polymer particles have smaller specific gravity than the aqueous dispersion medium. Then, the slurry containing the polymer particles and the aqueous dispersion medium is continuously recovered from the outlet 14. Alternatively, the polymer particles are caused to flow out from the outlet 13 together with the flow of aqueous dispersion medium and separated from the aqueous dispersion medium by a separator installed in the circulating line 3 between the outlet 13 and the circulating pump 15, and then the slurry containing the polymer particles and aqueous dispersion medium is recovered from a slurry recovering line 7 (see FIG. 5). The separator 20 may be a centrifugal separator, a solid-liquid separator comprising a screen, or a floatation separator utilizing the difference of specific gravity between the aqueous dispersion medium and the polymer particles.

The present invention will be explained in detail by following Examples, in which "part" and "%" are by weight unless otherwise indicated.

EXAMPLE 1

A monomer liquid comprising benzoyl peroxide (0.25 part) and t-butylperoxy-3,3,5-trimethylcyclohexane (0.15 part) dissolved in styrene (100 parts) was supplied at a rate of 0.4 liter/hr. to a droplet-forming device and deaerated before use. The droplet-forming device and a slurry supplying inlet of a reactor had been filled with an aqueous dispersion medium. The aqueous dispersion medium was supplied at a rate of 4 liter/hr.

The aqueous dispersion medium comprised sodium chloride having purity of 95% or higher (Common salt undried named "NAMIEN" manufactured by Japan Tobacco Inc.) (13%), polyvinylalcohol (GOSENOL GH-20 manufactured by Nippon Synthetic Chemical Industry Co., Ltd.) (0.006%), a polycarboxylic acid type polymeric anionic surfactant (CARRYBON B manufactured by Sanyo Chemical Industries Ltd.) (0.0005%), calcium phosphate (SUPERTITE ST-10 manufactured by Nippon Chemical Industrial Co., Ltd.) (0.045%) and sodium nitrite (0.006%) dissolved in ion exchanged water and deaerated before use. The aqueous dispersion medium had a specific gravity of 1.09 and surface tension of 56 dyne/cm. The droplet-forming device comprised a stainless steel orifice plate having one orifice with a diameter of 0.4 mm and regularly mechanically vibrated a jet flow of the monomer liquid flowed from the orifice at 250 Hz in a direction of the jet flow to form droplets of the monomer liquid in the aqueous dispersion medium. A slurry containing the monomer liquid droplets in the aqueous dispersion medium was supplied to the reactor having the head tank through the slurry supplying inlet and the inlet for aqueous dispersion medium at the reactor head. After one hour, the supply of the monomer liquid droplets was stopped.

Figure 3:
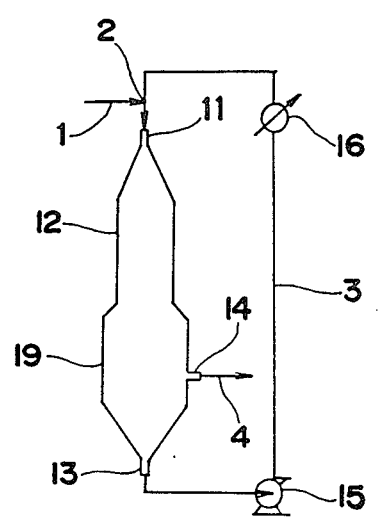

The reactor was a tower type reactor as shown in FIG. 3 and comprised of the upper cylindrical half having an inner diameter of 70 mm and a height of 150 mm and the lower cylindrical half having an inner diameter of 110 mm and a height of 150 mm which were connected by a truncated cone part of 75 mm in height. The upper and lower ends of the reactor were of conical shape. All the apparatus including the tower type reactor was filled with the aqueous dispersion medium before the supply of monomer liquid droplets, and in the tower type reactor, a downflow of aqueous dispersion medium was formed at a superficial velocity of 0.52 cm/sec. in the upper cylindrical half. The inlet for aqueous dispersion medium at the reactor head had an inner diameter of 18 mm and a height of 130 mm, and in said inlet, the aqueous dispersion medium was flowed at a superficial velocity of 7.7 cm/sec.

After the monomer liquid droplets formed a steady fluidized bed in the reactor, the circulated aqueous dispersion medium was heated to 90° C. by a heat exchanger installed in the circulating line, and the polymerization was carried out for 6 hours after the supply of the monomer liquid droplets. During the polymerization, the droplets were not merged or split, not discharged from the outlet together with the aqueous dispersion and maintained their sphere shapes. After the completion of polymerization, the whole system was cooled to around room temperature and the circulating pump was stopped. Then, the slurry containing the polymer particles in the aqueous dispersion medium formed in the reactor was recovered from the slurry outlet between the outlet for aqueous dispersion medium and the circulating pump to a storage tank in a short time. The polymerization conversion of the recovered polymer particles was 94% and had uniform particle size distribution as shown in Table 3. The particle size distribution was measured by the Tyler standard sieves.

TABLE 3

| Classification width (mesh) | 12–14 | 14–16 | 16–20 | 20–24 | 24– |
|---|---|---|---|---|---|
| % by weight | 0 | 1.2 | 98.5 | 0.3 | 0 |

EXAMPLE 2

In the same manner as in Example 1 but using a solute in Table 4 as the specific gravity modifying agent to adjust the specific gravity of the aqueous dispersion medium at 1.09, the formation of the monomer liquid droplets and polymerization were carried out.

The results are shown in Table 4.

TABLE 4

| Solute | Concentration[1] (% by weight) | Formation[*2] of droplets | Polymerization[*3] |
|---|---|---|---|
| NaCl | 13 | O | O |
| KCl | 14 | O | O |
| LiCl | 16 | O | O |
| MgCl$_2$ | 11 | O | O |
| CaCl$_2$ | 11 | O | O |
| NaCl[*4] | 13 | O | O |
| Sucrose | 23 | Δ | Δ |
| Glycerin | 37 | X | X |
| Urea | 34 | O | Δ |

Note
[*1] Concentration at which the specific gravity of the aqueous dispersion medium becomes 1.09 at room temperature.
[*2] O: Stable formation of uniform droplets
Δ: After formation of uniform droplets, they are partly merged
X: No formation of uniform droplets
[*3] O: Stable polymerization without merging of droplets
Δ: Stable polymerization with partial merging of droplets
X: Uniformity of the reaction system was lost due to merging of droplets.
[*4] NAMIEN having purity of 95% or higher.

Example 3

In the same manner as in Example 1 but changing the concentration of NaCl mixture (NAMIEN), the polymerization was carried out. Depending on the specific gravity of the aqueous dispersion medium, the superficial velocity of downflow of the aqueous dispersion medium in the reactor was adjusted so that the monomer liquid droplets did not rise from the inlet for aqueous dispersion medium in order to make the retention time of droplet 6 hours. The droplets of monomer liquid were stably formed. The concentration of NaCl, specific gravity of the aqueous dispersion medium at room temperature and polymerization results are as follows:

When the concentration of NaCl was 7.5% corresponding to the specific gravity of aqueous dispersion medium of 1.057 (at room temperature), the polymerizing droplets were discharged from the outlet of the reactor together with the aqueous dispersion medium after 5 hours since the polymerization temperature was reached.

When the concentration of NaCl was 10% corresponding to the specific gravity of aqueous dispersion medium of 1.07 (at room temperature), the polymerization stably proceeded and uniform polymer particles were produced.

When the concentration of NaCl was 15% corresponding to the specific gravity of aqueous dispersion medium of 1.17 (at room temperature), the percentage of the monomer liquid droplets in the fluidized bed which comprises the monomer liquid droplets and the aqueous dispersion medium became too large so that flow of the droplets was decreased and a part of the droplet were merged since the difference of specific gravity between the monomer liquid droplet and the aqueous dispersion medium was large.

Comparative Example 1

In the same manner as in Example 1 but using, as a suspension stabilizer, sodium α-olefinsulfonate (an anionic surfactant) in place of the polycarboxylic acid type polymeric anionic surfactant, the polymerization was carried out. The aqueous dispersion medium had surface tension of 38 dyne/cm.

Many of the monomer liquid droplets were merged during the formation of the droplets, and the droplets began to merge only after 2 hours from the temperature rise to the polymerization temperature, and a part of them formed sticky cakes. Therefore, the polymerization could not be continued till a high conversion was achieved.

Comparative Example 2

In the same manner as in Example 1 but applying no mechanical vibration to the monomer liquid droplets from the orifice and supplying the monomer liquid droplets having nonuniform particle sizes to the tower type reactor, the polymerization was carried out. The fluidized bed separated into an upper layer containing large droplets and a lower layer containing small droplets. The flow rate of downflow of aqueous dispersion medium was adjusted so that the monomer liquid droplets did not rise higher than the level of the inlet for the aqueous dispersion medium. After about 2 hours polymerization, the small droplets were discharged from the outlet of the reactor together with the aqueous dispersion medium and flowed in the circulating line. The circulated monomer liquid droplets were split by high shear force generated by the circulating pump into diversed sizes.

Example 4

In this Example, the monomer liquid and the aqueous dispersion medium had the same compositions as used in example 1 and deaerated before use.

The monomer liquid was supplied at a flow rate of 10 l/hr. to the droplet-forming device, and the aqueous dispersion medium was supplied at a flow rate of 20 l/hr. The droplet-forming device comprised a stainless steel orifice plate having 50 orifices with a diameter of 0.23 mm and regularly mechanically vibrated a jet flow of the monomer liquid flowed from the orifices at 500 Hz to form droplets of the monomer liquid in the aqueous dispersion medium. A slurry containing the monomer liquid droplets in the aqueous dispersion medium was supplied to the reactor having the head tank through the slurry supplying inlet and the inlet for aqueous dispersion medium at the reactor head.

The reactor was a tower type reactor and comprised of the upper cylindrical half having an inner diameter of 300 mm and a height of 780 mm and the lower cylindrical half having an inner diameter of 450 mm and a height of 600 mm which were connected by a truncated cone part of 300 mm in height. The upper and lower ends of the reactor were of conical shape. All the apparatus including the tower type reactor was filled with the aqueous dispersion medium before the supply of monomer liquid droplets, and in the tower type reactor, a downflow of aqueous dispersion medium was formed at a superficial velocity of 0.32 cm/sec. in the upper cylindrical half. The circulating line near the reactor head was a two-stage type consisting of a lower cylinder having an inner diameter of 80 mm and a height of 125 mm and an upper cylinder having an inner diameter of 50 mm, and a down flow of aqueous dispersion medium was formed therein at a superficial velocity of 11.5 cm/sec. in the upper cylinder. The monomer liquid droplets supplied in the reactor formed a fluidized bed from the upper portion of the reactor. No monomer liquid droplet rose to the head tank but often air bubbles rose up to the head tank. After 6.5 hours, the lower end of the fluidized bed reached the outlet for recovering the slurry. Then, the slurry containing the polymer particles in the aqueous dispersion medium was continuously recovered from said outlet to the storing tank. During the polymerization, the droplets were not merged or split, not discharged together with the circulating aqueous dispersion medium and maintained their sphere shapes. Thereafter, the polymerization system reached the steady state and polymerization was continued. The recovered polymer particles were not deformed by mechanical force during solid-liquid separation. The polymerization conversion of the recovered polymer particles was 92% and had uniform particle size distribution as shown in Table 5. The particle size distribution was measured by the Tyler standard sieves.

TABLE 5

| Classification width (mesh) | 20–24 | 24–28 | 28–32 | 32–35 | 35– |
|---|---|---|---|---|---|
| % by weight | 0 | 1.8 | 98.1 | 0.1 | 0 |

The supply of monomer liquid droplets was terminated after 20.5 hours from the start of their supply, and the polymerization was continued for another 6.5 hours. A large amount of polymer particles remained in the reactor. All remaining polymer particles in the aqueous dispersion medium were recovered within about 30 minutes by decreasing the flow rate of downflow in the inlet for the aqueous dispersion medium so as to raise the polymer particles up into the head tank. The polymer particles recovered in the head tank were not deformed either and had a polymerization conversion of 93%. They had the same particle size distribution as the polymer particles which were continuously recovered.

Example 5

The process proceeds in the same manner as in Example 4 but using a droplet-forming device comprising an orifice plate having 25 orifices with a diameter of 0.4 mm and regularly vibrating a jet flow of the monomer liquid flowed from the orifices at 250 Hz in the direction of the jet flow to form monomer liquid droplets. In the tower type reactor, the polymerization proceeded with forming a downflow of aqueous dispersion medium at a superficial velocity of 0.47 cm/sec., and the produced polymer particles were recovered in the same manner as in Example 4. The polymer particles were of sphere shape and had a polymerization conversion of 94%. The particle size distribution was measured in the same way as in Example 4. The results are shown in Table 6.

TABLE 6

| Classification width (mesh) | 12–14 | 14–16 | 16–20 | 20–24 | 24– |
|---|---|---|---|---|---|
| % by weight | 0 | 0.7 | 99.3 | 0 | 0 |

What is claimed is:

1. A process for suspension polymerization, which comprises steps of:

supplying a slurry comprising droplets of a monomer liquid having a substantially uniform size dispersed in an aqueous dispersion medium to a tower reactor in which an aqueous dispersion medium heated at a polymerization temperature is charged from an upper portion of said reactor to form a downflow in the reactor, discharged from a lower part of said reactor and recycled to the upper portion of said reactor, and suspension polymerizing the monomer with avoiding merging or splitting of the droplets in a fluidized bed which is formed by the downflow of aqueous dispersion medium and buoyancy of the monomer liquid droplets, wherein the specific gravity of the aqueous dispersion medium is made larger than that of a polymer particle which is produced by suspension polymerization of the monomer liquid by the addition of a water soluble inorganic salt to the aqueous dispersion medium, and a polycarboxylic acid based anionic surfactant is used as a suspension stabilizer for the monomer liquid droplets, whereby a slurry comprising the aqueous dispersion medium and said polymer particles with high polymerization conversion is recovered directly from the reactor.

2. The process according to claim 1, wherein the specific gravity of the aqueous dispersion medium is adjusted by the addition of a water soluble inorganic salt to a range not less than 1.05 at room temperature according to the kind of the polymer to be produced.

3. The process according to claim 2, wherein the water soluble salt is at least one selected from the group consisting of chlorides, nitrides and sulfates of alkali metals, alkaline earth metals and ammonia.

4. The process according to claim 1, wherein the monomer liquid comprises at least one selected from the group consisting of mono-vinyl aromatic compounds, polyvinyl aromatic compounds, esters of $\alpha,\beta$-ethylenically unsaturated carboxylic acids, unsaturated nitriles, aliphatic vinyl esters and halo-olefins.

5. The process according to claim 4, wherein the mono-vinyl aromatic compound is styrene.

6. The process according to claim 1, wherein the monomer liquid contains a polymerization initiator for radical polymerization.

7. The process according to claim 3, wherein the water soluble salt is a mixture of sodium chloride.

8. The process according to claim 7 wherein the water soluble salt mixture contains at least 95% of sodium chloride.

9. The process according to claim 7, wherein the maximum concentration of the mixture of sodium chloride in the aqueous dispersion medium is such concentration that the monomer liquid droplets are not merged by compression flattening due to a large difference of specific gravity between the monomer liquid droplets and the aqueous dispersion medium.

10. The process according to claim 9, wherein the concentration of the mixture of sodium chloride in the aqueous dispersion medium is from 7.5 to 15% by weight.

11. The process according to claim 9, wherein the concentration of the mixture of sodium chloride in the aqueous dispersion medium is from 12 to 13% by weight.

12. The process according to claim 1, wherein the suspension stabilizer comprising the polycarboxylic acid based anionic surfactant is used in combination with at least one suspension stabilizer selected from the group consisting of polymeric protective colloids, powdery inorganic compounds hardly soluble in water and anionic surfactants other than said polycarboxylic anionic surfactant.

13. The process according to claim 12, wherein the polymeric protective colloid is used in a concentration of from 30 to 10,000 ppm based on the weight of the aqueous dispersion medium.

14. The process according to claim 12, wherein the polymeric protective colloid is polyvinylalcohol.

15. The process according to claim 12, wherein the aqueous dispersion medium contains a polymerization inhibitor.

16. The process according to claim 15, wherein the polymerization inhibitor is sodium nitrite.

17. The process according to claim 12, wherein the powdery inorganic compound is used in a concentration of from 0.03 to 1 % by weight based on the weight of the aqueous dispersion medium.

18. The process according to claim 17, wherein the powdery inorganic compound is powdery calcium phosphate.

19. The process according to claim 12, wherein the concentration of the polycarboxylic acid based anionic surfactant is 0.0003 to 0.002% by weight based on the weight of the aqueous dispersion medium.

20. The process according to claim 1 wherein the polymer to be produced has such high polymerization conversion that the polymer particle can be resistant to shear force generated by agitation blades and/or mechanical force generated by a liquid conveying pump and also a centrifugal separator which is used for solid-liquid separation of the slurry containing the polymer particles.

21. The process according to claim 20, wherein the polymer has a polymerization conversion of at least 85%.

22. The process according to claim 1, wherein the downflow of the aqueous dispersion medium has a superficial velocity of from 0.1 to 1 cm/sec.

23. The process according to claim 1, wherein the flow rate of the aqueous dispersion medium in the lower portion of the reactor is smaller than that in the upper portion of the reactor.

24. The process according to claim 23, wherein the flow rate of the aqueous dispersion medium in the lower portion of the reactor is not larger than 0.3 cm/sec. in terms of superficial velocity.

25. The process according to claim 1, wherein the tower reactor comprises a multi-stage cylinder in which the lower portion has a larger inner diameter than the upper portion.

26. The process according to claim 1, wherein the tower type reactor has a conical shape having the smallest diameter at its top and the largest diameter at its bottom.

27. The process according to claim 1, wherein formation of air bubbles due to dissolved air is prevented in the monomer liquid and the aqueous dispersion medium.

28. The process according to claim 27, wherein the dissolved air is deaerated from the monomer liquid and the aqueous dispersion medium to prevent the formation of air bubbles.

29. The process according to claim 27, wherein the monomer liquid and the aqueous dispersion medium are pressurized in the reactor to prevent the formation of air bubbles.

30. The process according to claim 1, wherein a head tank for recovering air bubbles from the reactor head by raising them through the inlet for aqueous dispersion medium is installed at a position higher than any part of the circulating line.

31. The process according to claim 1, wherein the flow rates of the downflows in the circulating line connected to the inlet and in the reactor are smaller than a rising rate of air bubbles.

32. The process according to claim 1, wherein the monomer liquid droplets are formed in the aqueous dispersion medium supplied from the inlet for aqueous dispersion medium by passing the monomer liquid through an orifice of an orifice plate in a droplet-forming device.

33. The process according to claim 32, wherein the droplet size of the monomer liquid is made uniform by adjusting the viscosity of monomer liquid which passes through the orifice.

34. The process according to claim 33, wherein the viscosity of the monomer liquid is adjusted by dissolving a polymer of the monomer in the monomer liquid.

35. The process according to claim 32, wherein the monomer liquid droplets are formed with applying vibration to the orifice plate or to the monomer liquid on or near the orifice plate.

36. The process according to claim 1, wherein the polycarboxylic acid based anionic surfactant is at least one selected from the group consisting of a copolymer of a salt of maleic acid with a light metal selected from the group consisting of lithium, sodium, potassium, calcium, magnesium and aluminum and a salt of a copolymer of maleic acid with said light metal.

37. The process according to claim 36, wherein a comonomer is used which is compolymerizable with the salt of maleic acid or free maleic acid and is a $C_4$–$C_{22}$ olefin.

38. The process according to claim 36, wherein a comonomer which is copolymerizable with a salt of maleic acid or free maleic acid is one selected from the group consisting of $C_1$–$C_8$ alkyl methacrylate and styrene.

* * * * *